May 13, 1952 F. E. CONDON 2,596,212
SYNTHESIS OF PINACOLONE
Filed Oct. 25, 1946
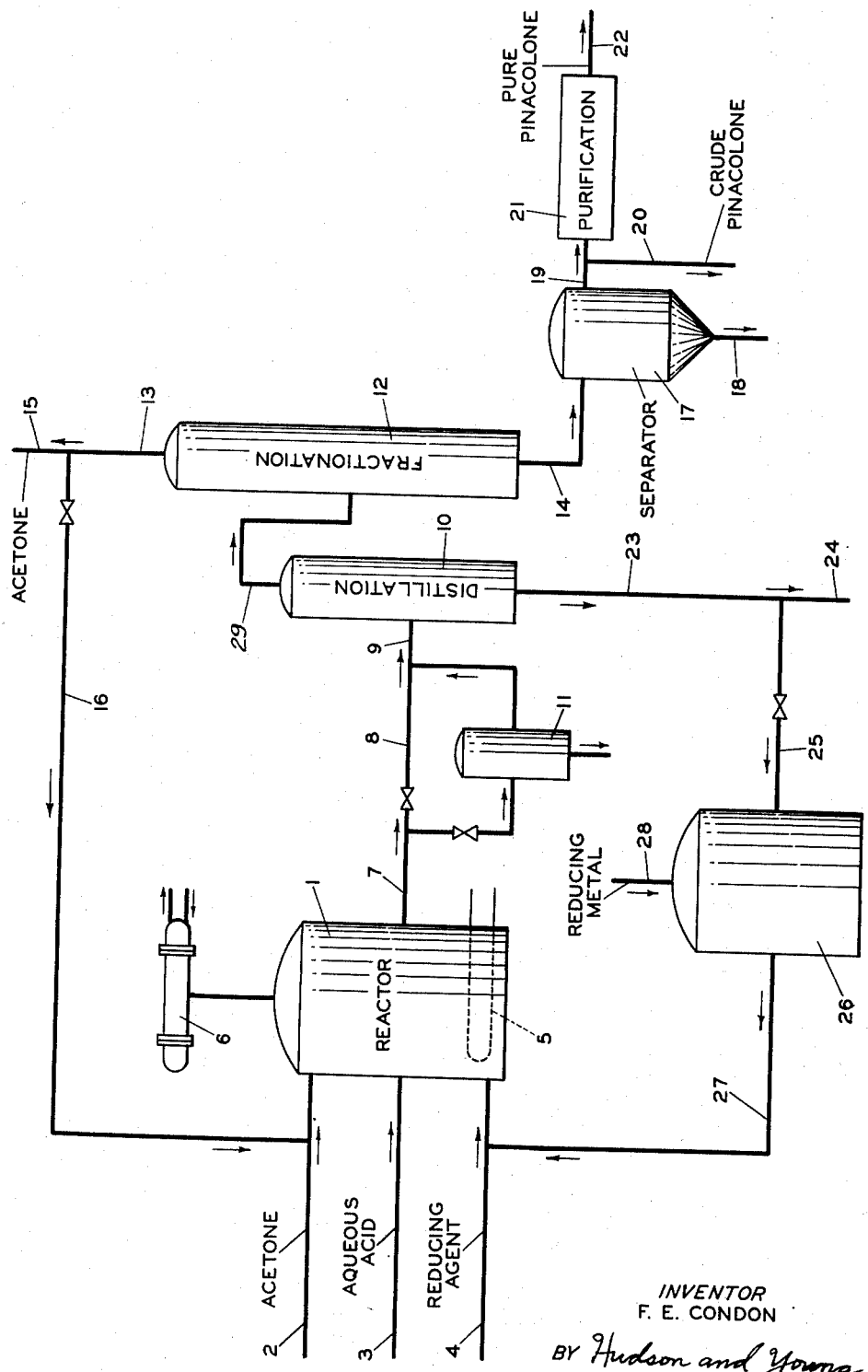
INVENTOR
F. E. CONDON
BY Hudson and Young
ATTORNEYS Patented May 13, 1952

2,596,212

UNITED STATES PATENT OFFICE 2,596,212

SYNTHESIS OF PINACOLONE

Francis E. Condon, Bartlesville, Okla., assignor to Phillips Petroleum Company, a corporation of Delaware Application October 25, 1946, Serial No. 705,683

1 Claim. (Cl. 260—593)

This invention relates to the synthesis of pinacolone.

Pinacolone is a valuable ketone, being useful both as a chemical intermediate and as a solvent.

In the past pinacolone (methyl tert-butyl ketone) has been prepared by reducing acetone to pinacol in one step and converting the pinacol to pinacolone in a separate step by warming with dilute acid, preferably a mineral acid. The synthesis of pinacol hydrate is described in "Organic Syntheses" Collective volume I (1932), pages 448–450. Conversion of the pinacol hydrate so produced to pinacolone is described on pages 451 and 452 of the same book. Generally the pinacolone has been prepared by reducing acetone with magnesium to obtain pinacol, isolating the pinacol as the hydrate, and distilling the pinacol hydrate in the presence of an acid to obtain pinacolone. This usual two-step procedure necessitates the isolation of pinacol hydrate as an intermediate. Since the prior process involved two steps and involved isolation of pinacol hydrate, it was undesirably complex. In Chemical Engineering Chemistry, volume 33, pages 253–259 (1927) there is disclosed the use of an electrolytic procedure employing zinc amalgam to act upon acetone in the presence of acid. The product is mainly propane. Some pinacolone is also obtained.

The present invention has as its principal object the provision of an improved procedure for preparing pinacolone. Another object is to provide an improved method of preparing pinacolone by the reduction of acetone. Another object is to provide a method of preparing pinacolone directly from acetone without the undesirable intermediate isolation of pinacol hydrate and without the complexity of carrying out two separate and distinct reaction steps under different reaction conditions. Another object is to provide a process for the direct production of pinacolone by reduction of acetone. A further object is to provide a process for the direct production of pinacolone by reduction of acetone without making use of electric current. Other objects of the present invention will more fully hereinafter appear.

The accompanying drawing portrays diagrammatically one arrangement of equipment which may be used for the production of pinacolone from acetone in accordance with the present invention.

I have now discovered that pinacolone may be produced directly from acetone in a single reaction step by heating acetone in the presence of an aqueous acid and a reducing agent whereby the acetone is converted directly to pinacolone. It may be that the mechanism of the present invention involves reduction of acetone to pinacol and simultaneous dehydration and rearrangement of the pinacol to pinacolone. Regardless of the mechanism or the theory, it was unforeseeable and unexpected that acetone could be converted directly to pinacolone in a single step. It was unpredictable that the reduction would take place in an acid medium or that pinacolone would be formed in the presence of the reducing medium.

In carrying out my invention, acetone is reduced in the presence of an acid by means of a suitable reducing agent. As the reducing agent, I prefer to use either chromous chloride or a metallic reagent such as zinc or zinc amalgam. The reduction may be satisfactorily conducted by heating the acetone together with the reducing agent and aqueous hydrochloric acid in a suitable container such as one of glass or corrosion-resistant metal, the container being provided with a water-cooled reflux condenser. Sufficient acid is used to maintain the reaction mixture acidic throughout the reduction and the subsequent distillation.

At the end of a suitable reaction period, usually 0.5 to 5 hours, the liquid mixture is separated from any excess solid reducing agent and is distilled to separate as distillate substantially all the reduction product (mainly or exclusively pinacolone) together with the unreacted acetone and some water.

The distillate is then fractionally distilled to remove the unreacted acetone as an overhead fraction. The kettle residue separates into two liquid phases, the upper of which comprises crude pinacolone. The crude product is separated and if desired may be further purified by distillation and/or drying.

The process of the present invention may be conducted continuously with recycling of the unreacted acetone to the reducing step. When chromous chloride is used as the reducing agent, the residual aqueous solution from the first distillation may be contacted with a reducing metal, such as zinc, to regenerate the chromous chloride by reduction of the chromic chloride to the chromous form. This regeneration of spent chromous chloride is a very important feature of my invention and in the embodiment wherein chromous chloride is used as the reducing agent makes the difference between a commercially feasible process and one which is not commercially feasible. The thus regenerated chromous chloride is recycled to the reduction step. Instead of regenerating the spent chromous chloride with zinc, any other method of reducing the chromic chloride to the chromous form may be employed.

The temperature at which the reaction step of my invention is carried out is usually the boiling point of the reaction mixture at atmospheric pressure. Generally this temperature will be somewhat below 100° C. Superatmospheric pressures may be employed but they present no advantage over the use of atmospheric pressure.

The time of the reaction may vary over wide limits, generally it will not be less than one-half hour or greater than five hours. The reaction time should be such that a substantial proportion of the reducing agent is consumed. Determination of a suitable reaction time will depend upon a number of factors and will be well within the skill of those working in the art in the light of my disclosure.

As the acid I prefer to use aqueous hydrochloric acid. However, the use of other mineral acids such as aqueous sulfuric acid, aqueous phosphoric acid, etc. or the use of suitable organic acids is within the scope of my invention in its broader aspects. Any acid which has the necessary acidity and is not harmful in the reaction mixture may be employed. An example of an undesirable acid is nitric acid which may not be used because it causes oxidation and other objectionable side reactions to take place.

As above stated, the amount of the acid present in the reaction step should be sufficient to keep to mixture acidic throughout the reduction step and the following distillation steps.

It is preferable to employ a considerable stoichiometric excess of acetone over reducing agent. Such an excess was employed in carrying out the examples below. However it is to be understood that the proportions of acetone and reducing agent may be varied over wide limits without departing from the inventive concept and that the process is operable even though the acetone and reducing agent are present in stoichiometrically equivalent proportions.

In the drawing acetone, aqueous acid, and a reducing agent are charged to reactor 1 via lines 2, 3 and 4, respectively. Reactor 1 is provided with means 5 for heating and with a reflux condenser 6 which is adapted to condense and return to reaction vessel 1 any normally liquid components volatilized from reactor 1 which is maintained substantially at the boiling point. If desired reactor 1 may be provided with means for agitating the reaction mixture. However the boiling of the reaction mixture may provide the necessary agitation.

The reaction mixture may be passed via lines 7, 8 and 9 into distillation unit 10. If a solid reducing agent is present in the separated liquid reaction mixture, such solid reducing agent may be separated by passing the reaction mixture through separator 11 on its way to the still 10.

Still 10 may be either a simple batch still, for example one of the pot type, or it may be a simple fractionation column. Still 10 serves to drive the reduction product, the unreacted acetone and some water overhead via line 29. This overhead product may be condensed (means not shown) and the condensate fed into fractional distillation column 12 which separates the unreacted acetone as overhead product leaving via line 13 from a liquid residual kettle product which leaves via line 14. The unreacted acetone overhead may be withdrawn from the system via line 15 however it is generally preferable to recycle it to the reactor 1 by means of line 16.

The residual kettle product from column 12 is passed via line 14 to a layer separation unit 17 where it is allowed to separate by gravity into an upper organic layer of crude pinacolone and a lower aqueous layer which may be withdrawn via line 18 and discarded. The upper layer of crude pinacolone is withdrawn via line 19 and may leave the system via line 20. Generally however it will be preferable to pass the crude pinacolone to a purification unit indicated generally by reference numeral 21 wherein substantially pure pinacolone is recovered. This pure product may be withdrawn from the system via line 22.

The aqueous residual mixture formed in still 10 may be withdrawn via line 23 and discarded from the system via line 24. However where chromous chloride was used as the reducing agent, it is much preferred to pass this aqueous mixture via line 25 into a unit 26 wherein it is contacted with a reducing metal such as zinc to reduce the chromic chloride to the chromous form and to recycle the thus regenerated chromous chloride to reactor 1 vial line 27. The reducing metal may be added to unit 26 by means of line 28.

*Example I*

One hundred twenty grams (0.45 mole) of $CrCl_3 \cdot 6H_2O$ was dissolved in 250 cc. of $H_2O$ and 150 cc. of concentrated HCl (sp. g., 1.19), and 100 grams of granular zinc (20 mesh) was added. The resulting solution of chromous chloride was recanted from excess zinc and was added to about a liter of acetone. The mixture was refluxed an hour and then was distilled. The distillate was freed of acetone by distillation in a column. The kettle residue separated into two layers. The upper layer was about 15 cc. of crude pinacolone, an approximately 50 per cent yield based upon the maximum possible amount of chromous chloride used.

*Example II*

A mixture of 110 cc. of concentrated HCl, 220 cc. of acetone and 65 grams of amalgamated zinc was heated at reflux for about 4 hours. The solution was decanted from excess zinc and was distilled until the temperature passed 100° C. (212° F.). The distillate was freed of acetone by distillation in a column. The kettle residue separated into two layers. The upper layer was dried with calcium chloride. The dried material was fractionated and yielded 7 grams of pinacolone, an 18 per cent yield based on the amount of zinc consumed.

The indentity of the product was substantiated by determining the boiling point, the refractive index, and the melting points of the oxime and the semicarbazone. The data are given in the following table:

|  | Experimental | Literature |
| --- | --- | --- |
| Boiling point, °C | 106–113 | [2] 106.2 |
| Refractive Index ($n_D^{20}$) | 1.3998 | [2] 1.3956 |
| Oxime, melting point, °C | [1] 76–76.5 | [3] 77–78 |
| Oxime, mixed melting point, °C | [1] 75–77 |  |
| Semicarbazone, melting point, °C | [1] 154–156 | [3] 157 |

[1] Uncorrected.
[2] Beilstein, Handbuch der Organischen Chemie, 4th ed., I, 694.
[3] Huntress and Mulliken, Identification of Pure Organic Compounds (1941), p. 377.

The following example reproduces the experiment wherein the present invention was discovered.

Example III

An aqueous solution of chromous chloride was prepared as described by Conant and Cutter, J. Am. Chem. Soc. 48, 1023 (1926), by reduction of chromic chloride with amalgamated zinc. Such a solution was used by Julian, Cole, Magnani and Meyer, J. Am. Chem. Soc. 67, 1728 (1945) to reduce certain 1,2-dibromides to their parent olefins. Following the latter authors 400 cc. of 1N chromous chloride solution was diluted with 1 liter of acetone. Then 91.5 g. tert-butyl chloride was added. After refluxing for several hours, the mixture was distilled and the distillate was freed of acetone in a column. The residue separated into two layers. The organic layer (about 15 cc.) was crude pinacolone and possessed the typical powerful ketonic odor of pinacolone. Presumably this pinacolone was formed by dimolecular reduction of the acetone. Thus the experiment yielded pinacolone although it was carried out with the purpose of yielding a hydrocarbon by the hypothetical reaction

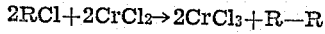

$$2RCl + 2CrCl_2 \rightarrow 2CrCl_3 + R-R$$

From the foregoing description many advantages of the present invention will be obvious to those skilled in the art. The principal advantage of course is that a simple and economical method of producing pinacolone from acetone is provided as a result of the elimination of two separate reaction steps and of the necessity of isolating pinacol hydrate as an intermediate, which have been characteristic of previous methods of synthesizing pinacolone. Another advantage is that the necessity of carrying out two separate and distinct reactions under different conditions and with different chemicals is obviated. Another advantage is that good yields of pinacolone are obtained.

I claim:

The process of non-electrolytically synthesizing pinacolone from acetone which comprises refluxing a mixture of 131 parts by weight of concentrated aqueous hydrochloric acid having a specific gravity of 1.19, 174 parts by weight of acetone and 65 parts by weight of amalgamated zinc at its boiling temperature for 4 hours, decanting the resulting solution from excess zinc and distilling same until the temperature passes 100° C., fractionally distilling the distillate to free same of acetone, separating the kettle residue into two layers, the upper layer being crude pinacolone, drying said upper layer and fractionally distilling same to recover substantially pure pinacolone as the principal product of the process.

FRANCIS E. CONDON.

REFERENCES CITED

The following references are of record in the file of this patent:

Mailhe, Bull. Soc. Chim. 21, pages 61–64 (1917).
Muller, "Zeitschrift fur Electrochemie," vol. 33, pages 253–259 (1927).
Gilman, "Organic Synthesis," collected vol. I, (1932), pages 448–452.
Couturier et al., Compt. rend., vol. 140, pages 721–723 (1905).
Adams et al., "Organic Reactions," vol. I, pages 157 and 162, published 1942, John Wiley & Sons, New York.